United States Patent [19]

Van Iperen

[11] Patent Number: 4,667,603
[45] Date of Patent: May 26, 1987

[54] ARTICULATED CAR FOR INTERMODAL CONTAINERS

[75] Inventor: Willem H. P. Van Iperen, Westfield, N.J.

[73] Assignee: Sea-Land Corporation, Inc., Elizabeth, N.J.

[21] Appl. No.: 767,429

[22] Filed: Aug. 20, 1985

[51] Int. Cl.[4] ............................................. B61G 5/02
[52] U.S. Cl. .................................... 105/4.1; 105/407; 105/182.1; 410/52
[58] Field of Search .............. 105/3, 4 R, 4 A, 199 R, 105/199 C, 199 CB, 199 A, 199 F, 199 S, 157 R, 182 R, 404, 407; 410/52, 54; 267/3; 105/174, 175 R, 176

[56] References Cited

U.S. PATENT DOCUMENTS

| 267,335 | 11/1882 | Driggs . | |
| 884,420 | 4/1908 | Rounds | 105/4 R |
| 1,412,053 | 4/1922 | Gresley | 105/4 R |
| 1,456,839 | 5/1923 | Westlake . | |
| 2,065,763 | 11/1936 | Stucki . | |
| 2,170,095 | 8/1939 | Ronk | 105/4 A |
| 2,508,339 | 5/1950 | Schroeder et al. . | |
| 2,601,928 | 7/1952 | Walsh et al. . | |
| 2,605,718 | 8/1952 | Omar et al. . | |
| 2,915,020 | 11/1959 | Bleibtreu . | |
| 3,212,456 | 10/1965 | Dilworth et al. | 105/199 R |
| 3,319,583 | 5/1967 | Gutridge . | |
| 3,521,569 | 7/1970 | Muotka et al. . | |
| 3,650,219 | 3/1972 | Seely . | |
| 3,961,582 | 6/1976 | Paton et al. . | |
| 4,315,465 | 2/1982 | Cordani et al. . | |
| 4,339,996 | 7/1982 | Brodeur et al. . | |
| 4,356,775 | 11/1982 | Paton et al. . | |
| 4,452,147 | 1/1984 | Jwuc . | |
| 4,456,413 | 6/1984 | Pavlick . | |
| 4,478,153 | 10/1984 | Eggert, Jr. | 105/182 R |

FOREIGN PATENT DOCUMENTS 1963679 2/1979 Fed. Rep. of Germany ... 105/199 S

Primary Examiner—Robert B. Reeves
Assistant Examiner—Dennis Rodgers
Attorney, Agent, or Firm—Scully, Scott, Murphy & Presser

[57] ABSTRACT

The specification discloses a new articulated car for transporting intermodal containers over a railroad. A novel bogey configuration having large sliding bearing assemblies is used to suspend the load below the axles of the bogies. Draft and buff forces are transmitted through the axles and side rails of the bogey rather than through the articulated coupling, thereby relieving stress on the coupling. The design makes it possible to lower the sills and the center of gravity by passing the load bearing members below the axles of the bogey.

20 Claims, 10 Drawing Figures

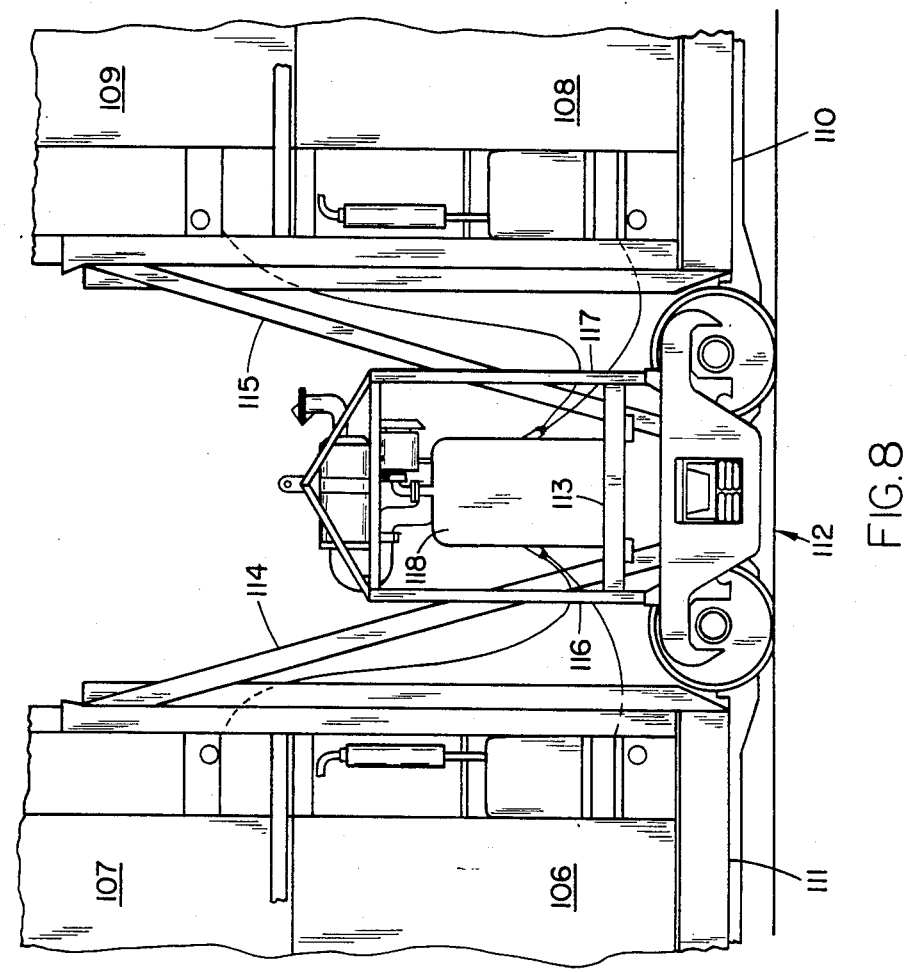

ARTICULATED CAR FOR INTERMODAL CONTAINERS

FIELD OF THE INVENTION

The present invention relates to an articulated car for transporting intermodal containers over a railroad. Articulated cars are assembled together into multi-car units having end strikers or couplers at either end of the unit. The articulated car units are particularly useful for transporting intermodal containers designed to be rapidly shifted between rail transport, truck transport, or sea transport.

PRIOR ART STATEMENT

The use of articulated car units to reduce the number of bogies in special purpose trains is well known in the art. The application of the articulated car to intermodal containers is also well known in the art.

U.S. Pat. No. 4,315,465 discloses an articulated rail car particularly adapted for transport of intermodal containers. In many ways, the structure disclosed in this reference is typical of the present state of technology inasmuch as two containers are stacked one above the other, and transported between each of the railroad bogies. This reference also discloses the use of a sliding bearing to transmit the load of the container car to the rail bogie along the sliding bearing rather than through a combined pivot and gooseneck connection. The present invention represents a substantial improvement over the structure disclosed in this patent, and achieves its improved features through the use of a substantially redesigned bogie construction.

U.S Pat. No. 4,452,147 discloses an articulated intermodal railway car for the transport of trucks thereon. This car uses a typical articulated connection wherein the vertical load bearing force and the draft horizontal forces are all focused into a center articulated pivot connection. The present invention is intended to diffuse this focus and minimize the loading on the pivot pin to thereby improve the articulation of the coupling.

U.S. Pat. No. 4,456,413 discloses still another approach to an articulated rail vehicle for transporting freight containers. A recessed center body portion is used to reduce the height of the truck trailers transported in this rail car. It should be noted that the APL Thrall car manufactured by Thrallcar, Chicago Heights, Ill. uses the same concept to reduce the height of a double stack container. This concept requires that a lower body portion be constructed to house the container recessed below the side sills U.S. Pat. No. 267,335 discloses a car truck for use in a railroad wherein the car bodies are suspended from a single wheel mounted there between.

U.S. Pat. No. 3,650,219 discloses a resiliently supported articulated railway vehicle which uses a plurality of elastomeric springs between the vehicle body and the bogie.

U.S. Pat. Nos. 1,456,839 and 2,065,763 disclose representative slide bearings used in articulated rail vehicles.

U.S. Pat. No. 3,319,583 discloses a railroad car for the transport of containers which uses an open framework having a plurality of trusses therein for supporting the containers. This car is intended to carry a plurality of containers, and is not articulated.

U.S. Pat. No. 2,601,928 discloses a pair of auxiliary struts which extend outwardly and downwardly from the upper portion of a rail car to a coupling mechanism.

SUMMARY OF THE INVENTION

The present invention represents an improvement over the previously described articulated cars intended for the transport of intermodal containers. In particular, an improved bogie structure is used to substantially lower the sills of the vehicle by passing the load bearing members of the vehicle under the bogie axles.

The bogie of the present articulated rail vehicle supports the adjacent ends of a pair of rail car bodies. The bogie has a first and second wheel pair with each of the pair having a single axle for supporting the bogie. A load bearing means for each of the rail car bodies passes under its respective axle and is slideably supported therefrom by first and second bearing assemblies. A center bolster is provided with a pivot pin for pivotally engaging the first and second load bearing means. The horizontal or draft forces of the vehicle are transmitted through the rail bogie by means of a second pair of sliding bearings mounted between the bearing assemblies and the load bearing means for each of the container cars. This means that the pivotal connection itself is relatively free of both horizontal (draft) and vertical (load bearing) forces, and is thus relatively free for articulation in response to track irregularities. Slack induced high impact loading forces are also minimized by use of these articulated sliding bearings.

It is another object of the present invention to provide a mechanical structure for an intermodal rail car to comply with AAR clearance standards when hauling a variety of different sized intermodal containers, including 45 foot containers.

The articulated car of the present invention utilizes a pair of longitudinal sills that are joined together at either end by the load bearing means which passes under the bogie axle. Vertical upright members are provided at each corner of the car with an open truss framework connecting each of the vertical uprights with their respective sills and the transverse load bearing means. The vertical uprights extend beyond the height of the first container. By passing the load bearing means of the car under the axle, it is possible to stack two containers, one above the other, and still construct an intermodal railway car that will operate within the height constraints imposed by train tunnels leading in and out of the New York City area. Previously, with the exception of the APL thrall car, intermodal rail cars transporting double decked containers where restricted to southern and southwestern routes where tunnels were not present.

It is still another object of the present invention to provide an intermodal rail car designed to minimize the material cost and weight of the car.

It is still another object of the present invention to eliminate the 90° gooseneck pivot joints normally found at either end of an articulated rail car.

It is a further object of the present invention to reduce the wind resistance and weight of the car to maximize the fuel efficiency of a locomotive pulling a train comprised of articulated rail car units.

It is another object of the present invention to reduce the overall length of an articulated car by improving the articulated connection between the bogie and the car to thereby allow a higher density of containers per car for a given train length.

Finally, it another object of the present invention to provide a stable mounting platform between each of the container cars for mounting an auxiliary generator to power refrigerated containers.

BRIEF DESCRIPTION OF THE DRAWINGS

FIG. 8 is a diagramatic view of a stable platform utilized to mount a diesel generator for refrigerated containers.

DETAILED DESCRIPTION OF THE PREFERRED EMBODIMENT

Figure 1:
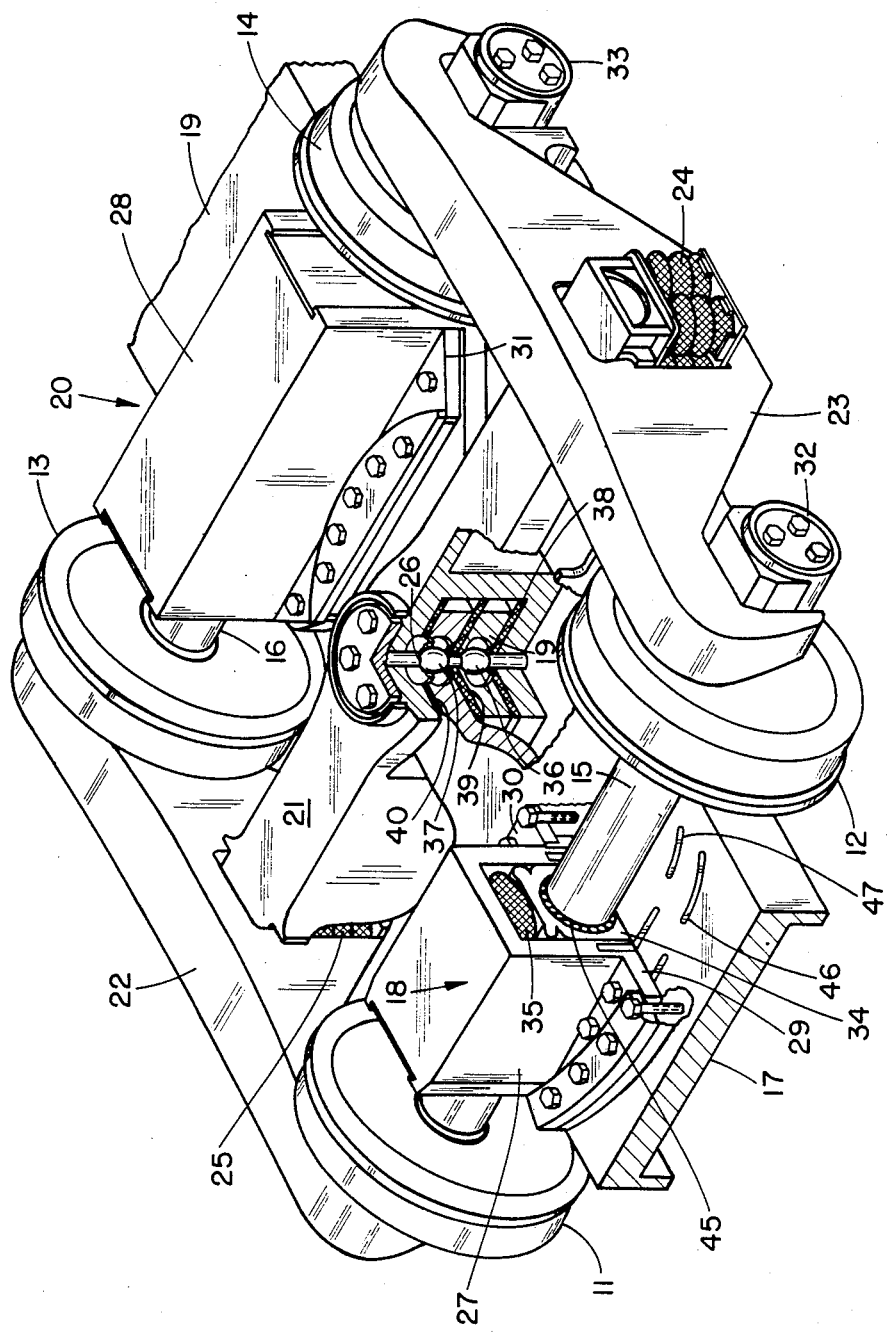
FIG. 1 is an isometric and partially cross-sectioned view of the improved bogie of the present invention.

FIG. 1 illustrates the bogie of the present invention in a diagramatic, isometric and partially cross sectioned view. This view illustrates a first wheel pair 11, 12 and a second wheel pair 13, 14, with each wheel pair joined together by a single axle 15, 16. A first slideable load bearing means 17 passes under the axle 15 and is supported therefrom by a bearing assembly denoted at 18. A second slideable load bearing means 19 is attached to the next car in the articulated car unit, and passes under axle 16 and is suspended therefrom by means of bearing assembly 20. A center bolster 21 is mounted within a bogie frame comprised of a first side frame 22 and a second side frame 23. The center bolster 21 is supported by means of elastomeric springs generally indicated at 24 and 25. The center bolster also includes a pivot pin 26 which extends downwardly through and pivotally engages the first load bearing means 17 and the second load bearing means 19. The vertical load is suspended from the axles 15, 16 by means of the bearing assemblies 18, 20 which include a first and second inverted U-shaped yokes 27 and 28, each of which have horizontal flanges attached thereto. The inverted yoke 27 has a first horizontal flange 29 and a second horizontal flange 30 which engaged the slideable load bearing means 17. Likewise, the inverted yoke 28 includes a first horizontal flange 31 and a second flange (not shown) which also engage the slideable load bearing means 19. As will be hereinafter further explained with respect to FIG. 2, the flanges defined on the yokes 27, 28 also engage an arcuate sliding bearing means defined on the first and second load bearing means 17, 19. This arcuate slide bearing transmits the horizontal or draft forces from the first load bearing means 17 to the bearing assembly 18, and thereby axle member 15. The forces are then transmitted along bogie sideframes 22, 23 to the second axle 16 to be received by the second bearing assembly 20. The second bearing assembly 20 transmits the draft force onto the next vehicle by means of an another arcuate sliding bearing means which engages the second load bearing means 19.

In a similar manner, the vertical loading of the first car is transmitted through the load bearing means 17 to axle 15 by means of the first bearing assembly 18. The vertical loading of a second vehicle is also transmitted to axle 16 by means of the second bearing assembly 20. The manner in which these forces are transmitted will be hereinafter explained with respect to FIG. 2.

The bogie axles 15, 16 are journaled for rotation in bogie side frame 23 by means of journal boxes 32, 33, and are likewise journaled for rotation in bogie sideframe 22 by means of a second pair of journal bearing boxes (not shown).

The axles 15, 16 are also journaled for rotation within the bearing assemblies 18, 20 by means of a series of bearing pads, one of which is illustrated in FIG. 1 at 34. Bearing pad 34 is free to reciprocate vertically within the inverted yoke 27, and is restrained from vertical reciprocation by means of elastomeric spring means 35. While a single bearing pad and elastomeric means is illustrated in FIG. 1, it will be clear from a description of FIG. 4 that a plurality of bearing pads and elastomeric springs may be used to transmit the vertical loading force from the first load bearing means 17 to the axle 15, and thereby to wheels 11, 12. Each of the axles is also journaled for rotation within the bearing pads as indicated by roller bearing 45.

The spherical cylinders 36, 37 around the center pin 26 and the elastomeric pads 38-40 between the surfaces of the first and second load bearing means 17, 19 allow for vertical articulation in response to track variations. The horizontal rail dynamic forces are primarily absorbed by the first and second bearing assemblies 18, 20 which are coupled together by means of axles 15, 16 and bogie side plates 22, 23. The center hinge point and the bolster therefor will only experience minimal horizontal dynamic forces and thus, the car will articulate freely. This design allows the load bearing means, which carries the container, to be closer to the bogie wheel than other designs intended for carrying double stacked containers. This design feature allows for the realization of a shorter articulated car unit within a given overall train length and a higher number of containers.

Figure 2:
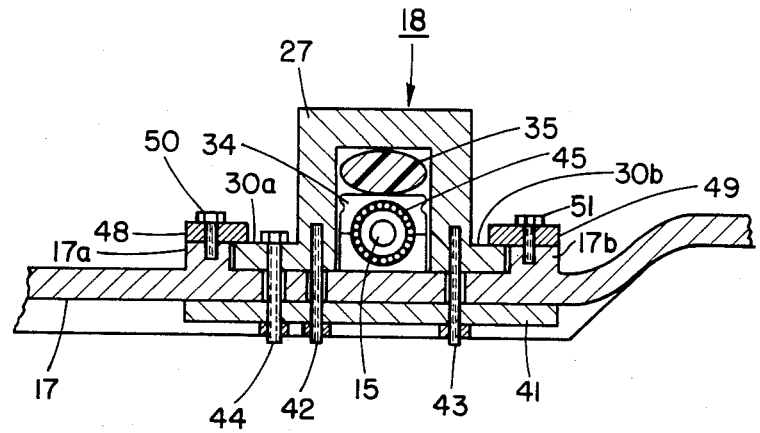
FIG. 2 is a cross section of the sliding bearing assembly utilized in the present invention.

FIG. 2 further illustrates the bearing assembly in cross section. The axle 15 is journaled for rotation within bearing pad 34 by means of roller bearing 45. Bearing pad 34 and roller bearing 45 are normally split for installation around the axle 15 inasmuch as the wheel set 11, 12 is normally fixably secured to the axle. The bearing pad 34 is free to reciprocate vertically within the inverted U-shaped yoke 27, but is restrained by means of elastomeric spring means 35. The inverted yoke 27 defines horizontal flange members 30a, 30b which are instrumental in transmitting the draft or horizontal forces of the vehicle from the first load bearing means 17 to the axle 15. The horizontal flanges 30a, 30b are arcuate as will be hereinafter explained with respect to FIG. 4 and bear against a pair of upwardly extending dogs 17a, 17b defined by the slideable load bearing means 17. As the load bearing means 17 slideably pivots about center pin 26, the arcuate flanges 30a, 30b and the upstanding dogs 17a, 17b provide a continuous slideable bearing for transmitting horizontal draft forces to the axles, rather than to the pivot pin. As indicated previously, the draft forces are transmitted between the axles 15, 16 by means of side frames 22, 23.

The vertical loading of the car is transmitted from the first load bearing means 17 to a load bearing plate 41 which underlies the load bearing means 17 and provides a substantial bearing surface for receiving the forces therefrom. The bearing plate 41 is in turn coupled to the inverted yoke 27 by means of studs 42, 43 which threadably engaged the upstanding members of yoke 27. An auxiliary set of bolts indicated at 44 may also be provided. In order to provide the articulation necessary, the studs and bolts 42-44 travel through arcuate slots generally indicated at 46, 47 in FIG. 1. Finally, a pair of flanges 48, 49 are secured to the upstanding dogs 17a, 17b by means of studs or bolts 50, 51 to assist in assembling the bearing, and to provide a safety factor in the event of mechanical failure of any of the bolts 42-44. The studs and bolts 42-44 illustrated in FIG. 2 are representative of a continuous line of bolts as illustrated in FIG. 1.

Figure 3:
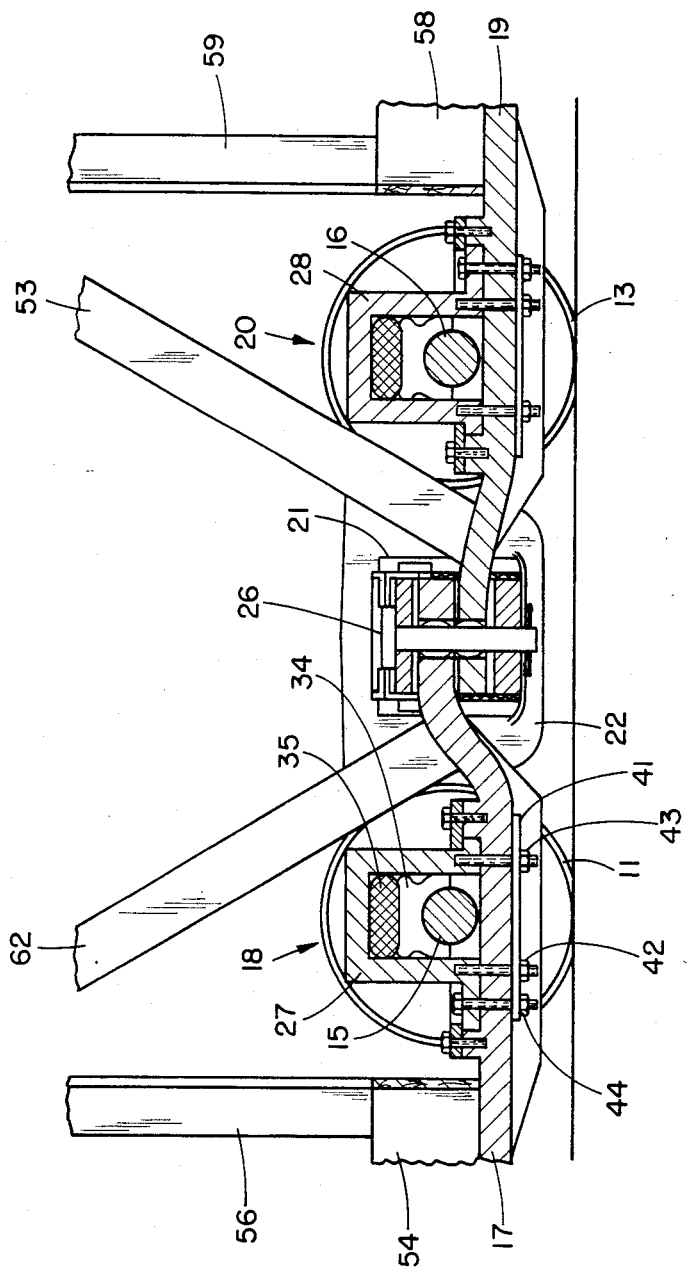
FIG. 3 is a cross sectional view of the improved bogie of the present invention.
Figure 4:
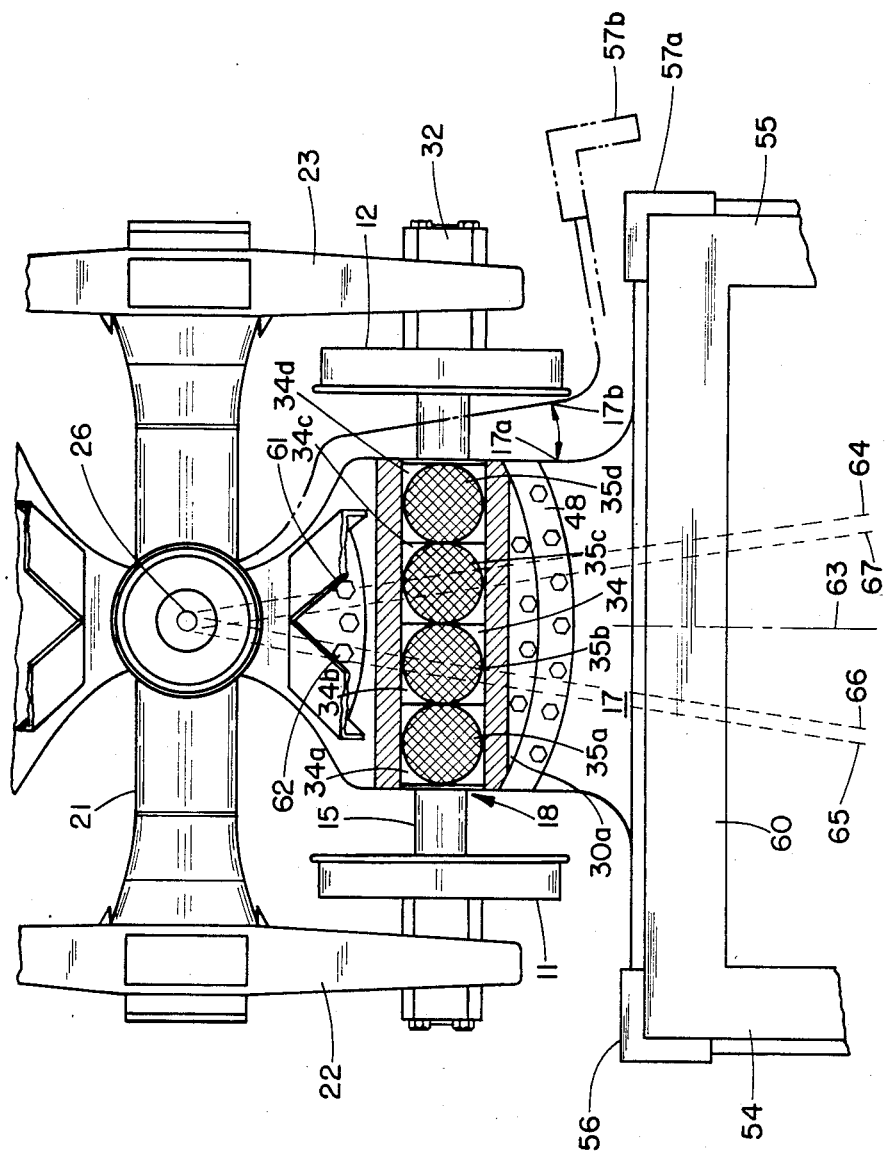
FIG. 4 is a partially cross sectioned top view of the improved bogie of the present invention.

As illustrated in FIG. 3, the first load bearing means 17 and the second load bearing means 19 provide a stable load receiving means for the frames of two adjacent container cars. As illustrated in FIGS. 3 and 4, the longitudinal sills 54, 55 of one car are mounted on the load bearing means 17. As illustrated in FIG. 4, the longitudinal sills are joined by a cross member 60 which may or not be integrally formed as part of the load bearing means 17. The container car also includes a pair of vertical uprights 56, 57 which act as container guides for directing the container into a aligned engagement with the longitudinal sills 54, 55 and the cross frame member 60. As will be hereinafter further described with respect to FIG. 6, the vertical upright member 56, 57 are further joined to the load bearing means 17 by means of diagonal truss braces 61, 62 which are joined to the load bearing means 17 between the pivot point 26 and the sliding bearing assembly 18, thus spanning the axle 15. These diagonal braces 61, 62 transmit portions of the longitudinal force encountered by the vertical upright 56, 57 to the load receiving means 17.

Likewise, a second container car is joined to the bogie as illustrated in FIG. 3 with longitudinal side sill 58, a vertical upright 59 and a diagonal brace 53.

As illustrated in FIG. 3, the load bearing means 17 is a separate member which receives a pair of container car frames. This manner of construction is useful in adapting the container car to various lengths of containers. The present standard length for containers is 40 feet, but there are a number of 35 foot-long containers which may be carried by the present invention as will be hereinafter illustrated with respect to FIGS. 5 and 6. Another common container size is 20 feet, two of which may be carried a 40 foot-long frame supported by longitudinal sills 54, 55. The present industry standard, however, is currently shifting to 45 foot-long container lengths and constucting a load bearing means 17 separate from the container car body would enable the industry conversion without distroying the usefulness of the existing bogies.

As illustrated in FIG. 4, the articulation of the vehicle occurs about the center pivot pin 26 and is approximately 12° on either side of center line 63 as indicated by the axis 64, 65. Thus, the rail car can negotiate track curves of 24°. The AAR requires a 20° curve articulation ability, indicated in FIG. 4 by the axis lines 66, 67. Articulation of the load support means 17 and its clearance with respect to wheel sets 11, 12 is indicated at 17a, 17b and 57a, 57b. The articulation of the load bearing means 17 is permitted by virtue of the slots representatively depicted as 46, 47 in FIG. 1. The articulation is guided by means of the arcuate flanges 30a, 30b, the upright dogs 17a, 17b, and the flanges 48, 49 previously described with respect to FIG. 2.

FIG. 4 also illustrates a plurality of elastomeric spring means 35a-35d. These spring means are contained within the inverted yoke 27 and generally support the separate bearing pads 34a-34d. This enables the vehicle to spread the load bearing requirements over a substanially greater axle length and thereby minimize the loading on any one bearing. In addition, if one bearing fails during a trip, there are still three other bearings to carry the load imposed on axle 15. Four bearing pads and four elastomeric supports have been illustrated in FIG. 4 for descriptive purposes, but it is understood that the number of bearing pads and elastomeric springs could be varied significantly without departing from the spirit of the present invention. While roller bearings 35 were used for descriptive purposes in FIGS. 1 and 2, it is also understood that a variety of bearing arrangements could be used including pairs of ball bearings, needle bearings, or bushings.

Figure 5:
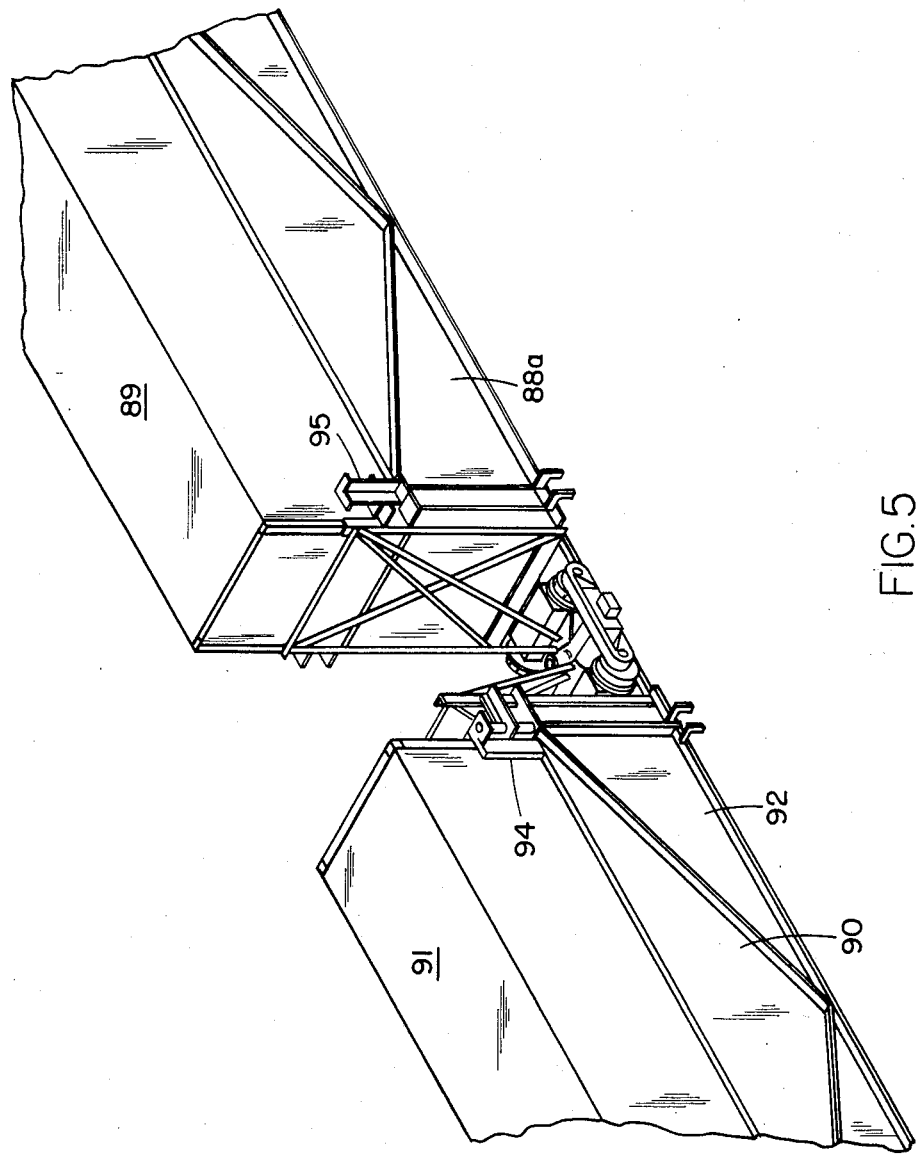
FIG. 5 is a diagramatic and isometric view of a pair of articulated cars joined by a single bogie and loaded with intermodal containers.
Figure 6:
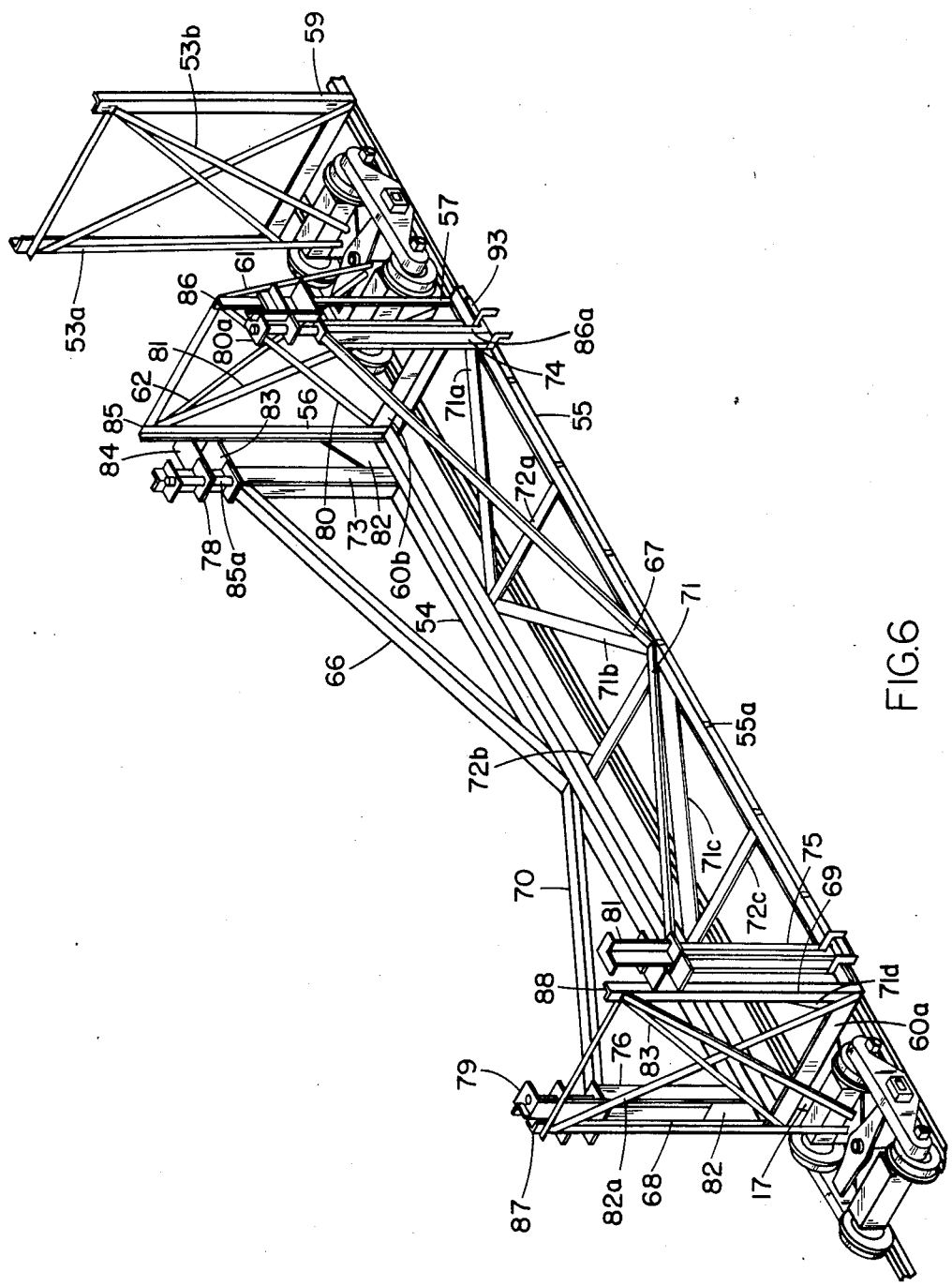
FIG. 6 is a diagramatic and isometric view of the open truss construction utilized in the construction of the present invention.

The articulated car frame and is use is more fully illustrated in FIGS. 5 and 6. As illustrated in FIG. 6, the articulated car frame includes first and second longitudinal sills 54, 55 which are joined together at their ends by the load bearing means 17 and angle braces 60a, 60b.

Figure 7A:
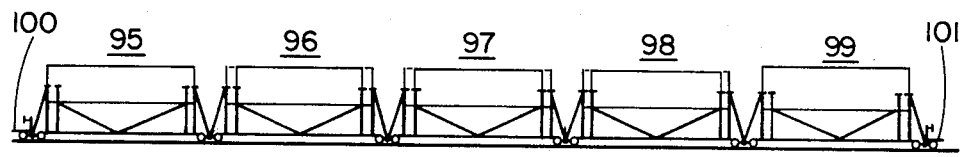
FIG. 7a illustrates a typical articulated car train unit comprised of five articulated cars carrying a plurality of containers thereon.
Figure 7B:
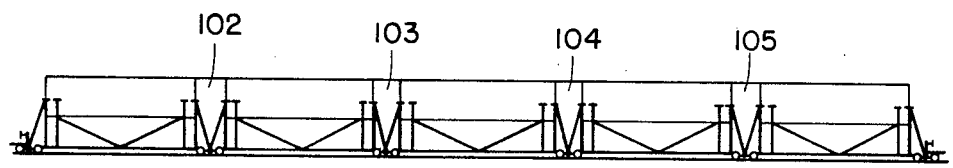
FIG. 7b is a diagramatic side view of an articulated train car unit illustrating one means of reducing wind resistance.

As indicated previously, the cross braces 60a, 60b may be integrally formed with the load bearing means 17, or may be fixably attached by means of bolts or rivets or the like. Vertical upright members 57, 58 and 68, 69 are defined at each corner of the vehicle where the longitudinal sills and load bearing means intersect. An open truss framework is used to connect each of the vertical uprights with the sills and the load bearing means with the truss framework extending upwardly beyond the height of the first modular container 88a, 90 as illustrated in FIG. 5. A single bogie is mounted between each intermediate train unit, with an end truck mounted on the first and last unit as illustrated in FIG. 7a, 7b.

The open truss frame is utilized in much the same manner as the truss network in a bridge span. Intermediate uprights 73-76 are spaced at 2½ feet inwardly from the corner members 56, 57 and 68, 69. This 2½ foot spacing allows the car to be used to support a shorter container on the upper standard as illustrated in FIG. 5. In this manner, a 40 foot container car will accomodate a 35 foot container on the upper level or a 45 foot car may accomodate a 40 foot container on the upper level. Each of the intermediate uprights 73-76 is connected to the exterior uprights by means of a cross brace 82 which is shown in particularity with respect to corner posts 73 and upright 56. The intermediate uprights 73-76 are connected to the longitudinal sills by means of diagonal trusses 66-70. The vertical uprights 56, 57 and 68, 69 are connected to the load bearing means 17 by a pair of crossing diagonal struts illustrated in FIG. 6 as 80, 81, 82a, and 83 and by the previously described diagonal struts 61, 62 and 53a, 53b. It should be noted that diagonal struts 80, 81, 82a and 83 provide for the structural rigidity of the open truss framework, whereas the diagonal struts 61, 62 and 53a, 53b provide for transfer of the horizontal forces to the load bearing means 17.

The lower floor of the container car is open and reinforced with diagonal trusses 71a–71d and cross braces 72a–72c. The truss framework used maximizes the strength to weight ratio for the car while simultaneously taking advantage of the inherent structural strength present within the containers themselves. Each of the containers 88–91 carries substantial corner bracing, both longitudinally and vertically, which cooperates with the open truss framework to providing maximum strength and rigidity. Each of the corner members 56, 57 and 68, 69 define inwardly open angle braces with upwardly flared container guides 85, 86 and 87, 88. These flared guides assist in loading the containers from above, while the internally oriented angles cooperate with the external corners of the container to add rigidity to the combined structure. Likewise, the longitudinal sills 54, 55 are formed from S-beams which have an inwardly oriented lower angle to receive the lower longitudinal edges of the container. The upper portion of the longitudinal sill is flared outwardly to receive the diagonal trusses 66, 67 and 70, 71. The longitudinal sills are periodically reinforced by triangular braces one of which is that designated as 55a in FIG. 6. With a slight modification of the center cross brace 72b, the container car may also be made to carry two 20 foot containers in the lower section, and a 35 or 40 foot-long container in the upper position.

FIG. 5 illustrates a shorter 35 foot-long container 91 carried in the upper portion of a container car constructed in accordance with the present invention. Adaptor means 78, 79, 80a and 81 are rotatably provided on each of the intermediate corner posts 73–76. As illustrated with respect to corner post 73, the angle bracket 78 is rotatably mounted on shaft 85a which extends throughout the adaptor, and down to the lower portion of the container car as illustrated by shaft 86a in corner post 74. When two 40 foot containers are to be carried, the adaptors are rotated outwardly as illustrated in FIG. 6. When it is desired to transport a 35 foot container, the lower 40 foot container is first loaded, and the shaft 86a is rotated by means of handle means 93 to bring the corner support plate and corner receiver 180° to an interior facing position for receipt of the 35 foot container. FIG. 5 illustrates at 94 an adapter means turned inwardly to receive a 35 foot container and at 95, an adaptor means turned outwardly to receive a 40 foot container. It should be noted that the intermediate vertical uprights 73–76 are much stronger and heavier than the external uprights 56, 57 and 68, 69 inasmuch as the intermediate uprights must support the weight of a fully loaded 35 foot container, whereas when the car is loaded with two 40 foot containers, the lower container 88 receives and supports the weight of the upper container 89 as illustrated in FIG. 5.

FIG. 7a illustrates some of the possible loading configurations present with the present invention. Platform 95 is loaded with two 20 foot containers and a single 40 foot container there above. Platform 96 is loaded with two 35 foot containers. Platform 97 is loaded with a 40 foot container with a 35 foot container there above. Platform 98 is loaded with two 20 foot containers with a 35 foot container there above. Platform 99 is loaded with a 40 foot regular container, and a 40 foot high cube container. At each of the end car the unit 95–99 is also equipped with a coupling bogie 100, 101. Each of these bogies is equipped with a conventional coupler, a conventional air brake and hand brake wheels. Each articulated rail car unit is made up of five platforms with the total length of the rail car from coupler to coupler of 250 feet. The normal prior art construction requires 263 to 265 feet for the same number of platforms. This reduction of 13 to 15 feet in the articulated car unit means that in a 20 car unit train, the present invention can take an additional rail car unit without exceeding maximum train length standards. This means 10 extra 40 foot containers may be loaded in a train using articulated cars of the present invention.

Using the open truss construction illustrated in FIG. 6, the total weight of the rail car is approximately 17% less than the APL Thrall car, or 30% less than a conventional articulated car adapted for hauling containers. This lightweight construction, making minimal use of materials with a high strength to weight ratio, reduces the amount of material used in constructing the car, and results in a substantial savings per train mile in fuel usage. The total reduced train weight means a projected savings of 0.66 gallon per mile over the APL Thrall car, and 1.3 gallon per mile over conventional articulated cars intended for carrying containers. When this fuel savings is multiplied by the number of miles in a coast to coast haul, it is apparent that thousands of gallons of fuel are saved by using the present design. The fuel consumption can be reduced even further by eliminating the air gaps between the containers as illustrated in FIG. 7b. By installing a plurality of canvas covers 102–105 between each of the container platforms the air drag can be reduced by approximately 55%. In addition, the canvas can be mounted on stays or spring loaded frames at each platform end thereby allowing the canvas to remain in place when the platforms are loaded.

One final advantage of the present invention is illustrated in FIG. 8. With the present articulated vehicle, a framework 113 may be constructed over the top of the bogie 112 by fixing vertical supports 116, 117 to each of the bogie side frames and then connecting them together with platform 113. This platform enables a diesel generator 118 to be mounted thereon to provide electric power for the refrigerated containers 106–109. The frame 113 spans the articulated joint, and is rigid and stationary with respect to the movements of both cars 110, 111 and the diagonal struts 114, 115.

Figure 9:
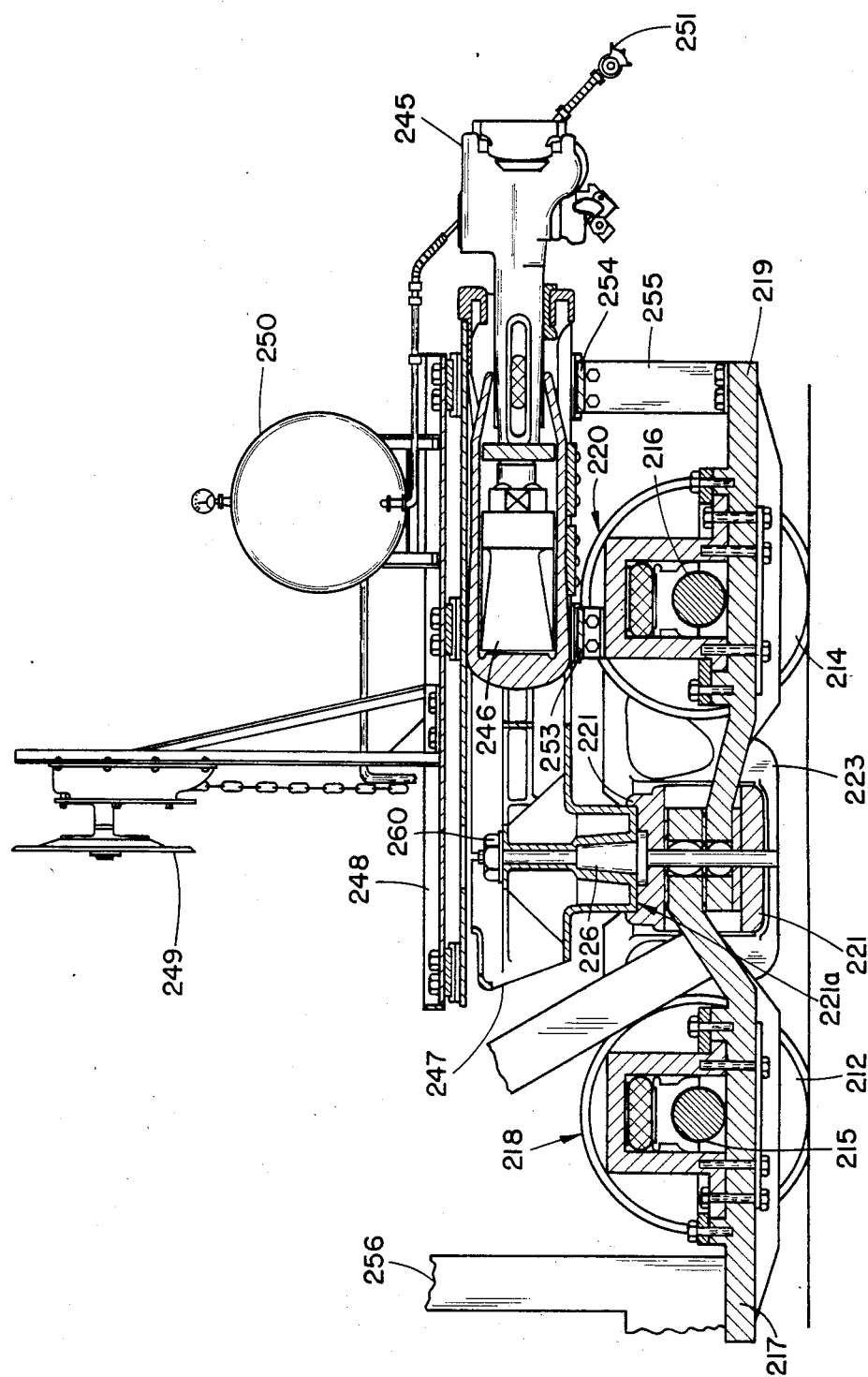
FIG. 9 is a partially cross-sectioned elevation view of an end bogie adapted for use with this present invention.

FIG. 9 is a partially cross section elevational view of an end bogie particularly adapted for use in the present invention. In this view, wheel numbers 212, 214 correspond to wheels 12, 14 previously described with respect to FIG. 1, while axles 215, 216 correspond to axles 15, 16 also illustrated in FIG. 1. A slideable load bearing means 217, having a container guide 256 is attached to one end of the bogie while a second slideable load bearing means 219 carrying a draft gear 246 and coupler 245 is attached to the other end of the bogie. The slideable load bearing means 217, 219 are joined together at the center pivot point by a draft pin 226. Pin 226 may be distinguished from pivot pin 226 illustrated in FIG. 1, inasmuch as it includes an upwardly extending section which receives the draft gear housing 247 and is secured thereto by means of nut 260. The coupler 245 and draft gear 246 are of conventional construction and are mounted on bearing assembly 220. The vertical forces exerted by the draft gear and coupler are transmitted to axle 216 directly through the load bearing pad 253 and by suspending the load received by pad 254 and transmitted to the slideable load bearing means 219 by means of vertical struts, one of which is illustrated at 255 in FIG. 9.

The end bogie also carries a work platform 248 which has mounted thereon a hand brake wheel 249 and an air reservoir 250 for use in the braking system in the articulated car. Air is supplied to reservoir 250 by means of air coupling means 251. The draft coupling and coupler pivot about pivot pin 226 with the horizontal draft forces being transmitted primarily through pivot pin 226 to the slideable load bearing means 217. A secondary transmission of forces occurs through the slideable load bearing means 219, bearing assembly 220, axle 216, and the side frames 223 back to axle 215, where it is retransmitted to the bearing assembly 218, and the slideable load bearing means 217. It should be noted also that the center bolster 221 has a recessed portion 221a which receives the downwardly projecting portion of the draft gear housing 247. This engagement also transmits portions of the load bearing forces from the draft gear to the center bolster 221, the bolster side frames 223, the axle 215, the bearing assembly 218, and the slideable load bearing means 217.

The foregoing specification and drawings are given for the purpose of illustrating and describing the invention, and not limiting it thereto since numerous changes and modifications will occur to those skilled in the art. It is intended that the following appended claims cover all such changes and modifications as fall within the true spirit and scope of the present invention.

What is claimed is:

1. A bogie for articulated rail vehicles, said bogie supporting the adjacent ends of a pair of rail car bodies and comprising;
   (a) first and second wheel assemblies, each assembly having a pair of wheels and a single axle for supporting the bogie;
   (b) first and second slideable load bearing means passing under said axles and supported therefrom by first and second bearing assemblies, each of said assemblies bearing along an associated axle between the wheels of the wheel pair;
   (c) a center bolster and pivot pin for pivotally engaging the first and second load bearing means;
   (d) a bogie frame adapted to transmit the longitudinal loading of said first load bearing means to the second load bearing means through said wheel assemblies and said frame.

2. A bogie as claimed in claim 1 wherein said slideable load bearing means slides in a pivotal manner with respect to its associated bearing assembly, said bearing assembly also being supported by its associated axle.

3. A bogie as claimed in claim 1 wherein said bearing assembly includes an inverted U-shaped yoke having outwardly extending flanges attached thereto, said bearing assembly rotatably receiving an associated axle and engaging said slideable load bearing means along said flanges.

4. A bogie as claimed in claim 1 or 2 or 3 wherein each of said bearing assemblies further defines
   (a) at least one reciprocating bearing pad for rotatably engaging an associated axle;
   (b) at least one elastomeric cushioning means mounted between said bearing assembly and said reciprocating bearing pad.

5. A bogie as claimed in claim 1 or 2 or 3 wherein said load bearing means is slotted and bears upon a bearing plate suspended from said bearing assembly by bolts which pass through said slots.

6. A bogie as claimed in claim 5 wherein each of said bearing assemblies defines at least one arcuate flange which engages a matching arcuate ridge formed on said load bearing means to thereby receive the draft loading from the load bearing means.

7. A bogie as claimed in claim 5 wherein said bearing assembly includes a plurality of independently reciprocating bearing means surrounding said axle and reciprocally engaging separate elastomeric cushioning means mounted within said bearing assembly.

8. A bogie as claimed in claim 7 wherein said bogie further defines elastomeric cushioning means between said center bolster and a bogie frame which connect said first and second wheel assemblies.

9. A bogie as claimed in claim 7 wherein said bogie further includes a plurality of elastomeric pads surrounding said pivot pin and arranged between said first and second load bearing means and between said load bearing means and said bolster.

10. An articulated rail car unit for transporting a plurality of modular shipping containers, said car unit including;
    (a) a car frame having first and second longitudinal sills, and sills being joined together at their ends by first and second slideable load bearing means;
    (b) a vertical upright member at each corner defined by said sills and said load bearing means;
    (c) an open truss framework connecting each of said vertical uprights with said sills and said load bearing means, said truss framework extending upwardly beyond the height of a first modular container resting on said sills;
    (d) a single bogie for each intermediate car frame, each bogie having a frame and first and second wheels pairs with load bearing axles connecting the wheels at each pair;
    (e) first and second vertical load bearing assemblies mounted on said first and second axles between the wheels of each wheel pair for suspending the first and second slideable load bearing means from adjacent car frames below said axles;
    (f) a center mounted bolster and pivot pin mounted on said frame for pivotally joining the complimentary load bearing means from two associated car frames about a common axis;
    wherein the sills and load bearing means may be lowered to thereby increase vertical loading capacity of said articulated car unit.

11. An articulated car unit as claimed in claim 10, wherein said car unit further includes diagonal struts which extend from the upper portion of said vertical uprights to the slideable load bearing means adjacent said pivot pin, each of said struts spanning its associated axle and bearing assembly.

12. An articulated car unit as claimed in claim 10 which further includes rotatable uprights adjacent each of the vertical uprights, said rotatable uprights having an adapter means for engaging a container corner mounted thereon, said means adapting said car unit to carry a shorter container when said adapter means are rotated inside the truss framework.

13. An articulated car unit as claimed in claim 10 which further includes a horizontal frame mounted above said bolster frame and connected thereto for supporting a power supply for refrigerated containers.

14. An articulated car unit as claimed in claim 10 which further includes a canvas fairing to span a gap existing between adjacent car units above said bogie.

15. An articulated car unit as claimed in claim 10 or 11 or 12 or 13 wherein said slideable load bearing means slides in a pivotal manner with respect to its associated bearing assembly, said bearing assembly also rotatably supporting its associated axle.

16. An articulated car unit as claimed in claim 10 or 11 or 12 or 13 wherein said load bearing means is slotted and bears upon a bearing plate suspended from such bearing assembly by bolts which pass through said slots.

17. An articulated car unit as claimed in claim 10 or 11 or 12 or 13 wherein said bearing assembly includes an inverted U-shaped yoke having outwardly extending flanges attached thereon, said bearing assembly rotatably receiving its associated axle and engaging said slideable load bearing means along said flanges.

18. An articulated car unit as claimed in claim 17 wherein said bearing assembly further defines (a) at lease one reciprocating bearing pad for rotatably engaging its associated axle and reciprocating within said U-shaped yoke;

(b) at lease one elastomeric cushioning means mounted between said reciprocating bearing pad and the upper portion of said U-shaped yoke.

19. An articulated car unit as claimed in claim 18 which further includes a plurality of independently reciprocating bearing pads surrounding said axle and reciprocally engaging separate elastomeric cushioning means mounted within said inverted U-shaped yoke.

20. An articulated car unit as claimed in claim 10 wherein said open truss frame work includes diagonal trusses from each vertical upright to said longitudinal sills.

* * * * *